(12) United States Patent
Ichikawa et al.

(10) Patent No.: US 11,149,791 B2
(45) Date of Patent: Oct. 19, 2021

(54) SLIDING MEMBER

(71) Applicant: TAIHO KOGYO CO., LTD., Aichi (JP)

(72) Inventors: Masaya Ichikawa, Toyota (JP); Shigeyuki Suga, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 0 days.

(21) Appl. No.: 17/042,542

(22) PCT Filed: Feb. 28, 2019

(86) PCT No.: PCT/JP2019/007765
§ 371 (c)(1),
(2) Date: Sep. 28, 2020

(87) PCT Pub. No.: WO2019/198369
PCT Pub. Date: Oct. 17, 2019

(65) Prior Publication Data
US 2021/0033145 A1 Feb. 4, 2021

(30) Foreign Application Priority Data

Apr. 11, 2018 (JP) .............................. JP2018-076209

(51) Int. Cl.
*F16C 33/12* (2006.01)
*B32B 15/01* (2006.01)
(Continued)

(52) U.S. Cl.
CPC ............ *F16C 33/125* (2013.01); *B22F 5/106* (2013.01); *B22F 7/08* (2013.01); *B32B 15/01* (2013.01); *C22C 9/02* (2013.01); *C22C 12/00* (2013.01); *C25D 3/56* (2013.01); *C25D 7/10* (2013.01); *B22F 2301/10* (2013.01); *C22C 5/06* (2013.01); *Y10T 428/12681* (2015.01);
(Continued)

(58) Field of Classification Search
None
See application file for complete search history.

(56) References Cited

U.S. PATENT DOCUMENTS 4,420,539 A 12/1983 Kostikov et al.
2004/0241489 A1 12/2004 Kawachi et al.
(Continued)

FOREIGN PATENT DOCUMENTS

CN 103774192 A 5/2014
DE 102007026832 B4 12/2010
(Continued)

OTHER PUBLICATIONS

Notice of Reasons for Refusal for JP 2019-529295 dated Jul. 23, 2019.
(Continued)

*Primary Examiner* — Xiaobei Wang
(74) *Attorney, Agent, or Firm* — Sughrue Mion, PLLC

(57) ABSTRACT

To provide a sliding member including an overlay capable of realizing good fatigue resistance while preventing interlayer peeling. A sliding member including an overlay formed of an alloy plating film of Bi and Sb, and the overlay is bonded to a lining formed of a copper alloy via an intermediate layer containing Ag as a main component.

1 Claim, 6 Drawing Sheets

(51) Int. Cl.
*C22C 12/00* (2006.01)
*C22C 5/06* (2006.01)
*B22F 5/10* (2006.01)
*B22F 7/08* (2006.01)
*C22C 9/02* (2006.01)
*C25D 3/56* (2006.01)
*C25D 7/10* (2006.01)

(52) U.S. Cl.
CPC ............... *Y10T 428/12882* (2015.01); *Y10T 428/12896* (2015.01); *Y10T 428/12903* (2015.01)

(56) References Cited

U.S. PATENT DOCUMENTS

| | | | |
|---|---|---|---|
| 2006/0216539 A1 | 9/2006 | Takayanagi et al. | |
| 2008/0102307 A1* | 5/2008 | Zidar | C23C 28/027 428/640 |
| 2012/0282481 A1* | 11/2012 | Yasui | F16C 33/121 428/555 |

FOREIGN PATENT DOCUMENTS

| | | |
|---|---|---|
| DE | 112011100455 T5 | 11/2012 |
| EP | 1 705 259 A1 | 9/2006 |
| GB | 2500487 A | 9/2013 |
| JP | 11270561 A | 10/1999 |
| JP | 2004-353042 A | 12/2004 |
| JP | 3693256 B2 | 9/2005 |
| JP | 2006 266445 A | 10/2006 |
| JP | 2008-57769 A | 3/2008 |
| JP | 2009-138272 A | 6/2009 |
| JP | 2019-183230 A | 10/2019 |
| JP | 2019-214771 A | 12/2019 |

OTHER PUBLICATIONS

International Search Report for PCT/JP2019/007765 dated, Apr. 2, 2019 (PCT/ISA/210).
Written Opinion of the International Searching Authority for PCT/JP2019/007765 dated, Apr. 2, 2019 (PCT/ISA/237).
Decision to Grant Patent for JP 2019-181977 dated, Nov. 12, 2019.
Communication dated Jan. 5, 2021 from the State Intellectual Property Office of P.R. of China in Application No. 201980019991.9.
Communication dated Mar. 4, 2021 from the German Patent and Trademark Office in DE Application No. 11 2019 001 859.0.
Communication dated Jul. 6, 2021, from the China National Intellectual Property Administration in application No. 201980019991.9.

* cited by examiner

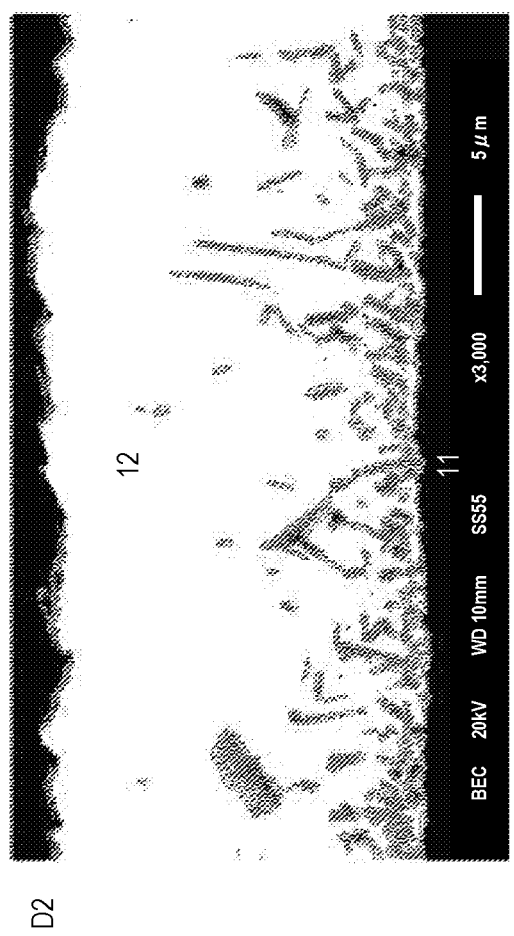
Fig. 5A
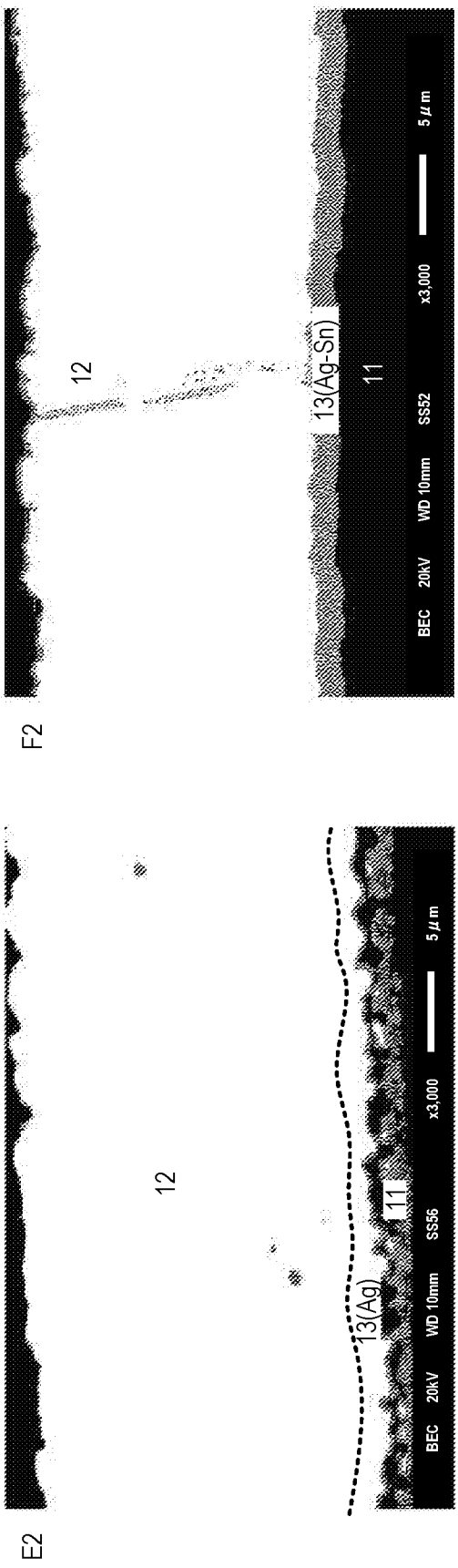
Fig. 5C
Fig. 5B

SLIDING MEMBER

CROSS REFERENCE TO RELATED APPLICATIONS

This application is a National Stage of International Application No. PCT/JP2019/007765 filed Feb. 28, 2019, claiming priority based Japanese Patent Application No. 2018-076209, filed Apr. 11, 2018.

TECHNICAL FIELD

The present invention relates to a sliding member including an overlay of an alloy plating film of Bi and Sb.

BACKGROUND ART

It is known that an overlay layer is formed of a Bi alloy having a Cu content of 0.1 to 10% by mass and an Sb content of 0.1 to 20% by mass (see Patent Literature 1). Patent Literature 1 discloses that Cu improves the fatigue resistance of the overlay layer by making the crystal structure of the Bi alloy dense. Further, Patent Literature 1 discloses that the addition of Sb can prevent reduction in melting point of the overlay layer and maintain the conformability.

CITATIONS LIST

Patent Literature

Patent Literature 1: JP 3693256 B

SUMMARY OF INVENTION

Technical Problems

However, when Cu and Sb coexist in the overlay layer as in Patent Literature 1, there is a problem that a Cu—Sb compound is formed in the overlay layer, so that the Cu—Sb compound deteriorates the fatigue resistance. In particular, when the overlay layer is formed on the lining formed of a copper alloy, there is a problem that Cu in the lining is diffused into the overlay layer, so that the generation of a Cu—Sb compound is promoted.

The present invention has been made in view of the above problems, and an object thereof is to provide a sliding member that can exhibit good fatigue resistance in an overlay of a Bi alloy containing Sb formed on a lining formed of a copper alloy.

Solutions to Problems

In order to achieve the above object, the sliding member of the present invention is a sliding member including an overlay formed of an alloy plating film of Bi and Sb. The concentration of Sb in the overlay is 3.1% by mass or more, and the overlay is bonded to a lining formed of a copper alloy via an intermediate layer containing Ag as a main component.

In the above configuration, since the overlay contains not only soft Bi but also hard Sb, the hard Sb can improve the fatigue resistance. Here, Cu has the property of being more easily diffused into Sb than into Bi. When the average concentration of Sb in the overlay is increased (for example, 3% by mass or more), Cu diffused from the lining into the overlay may reduce the fatigue resistance. Although the overlay can be made hard by increasing the average concentration of Sb in the overlay, excess Sb embrittles the overlay and causes deterioration in fatigue resistance, so the average concentration of Sb is desirably 10% by mass or less.

On the other hand, the interposition of an intermediate layer containing Ag as a main component, into which Cu is difficult to diffuse, between the lining and the overlay, can reduce the amount of Cu to be diffused from the lining into the overlay, and can also reduce the possibility of reduction in fatigue resistance. Here, the average concentration of Sb in the overlay means an average concentration of Sb in the entire range of the depth from the surface of the overlay. Further, an overlay 12 can be made harder as the concentration of Sb increases, and thus the fatigue resistance can further be improved by increasing the concentration of Sb.

BRIEF DESCRIPTION OF DRAWINGS

FIGS. 5A to 5C are photographs of cross sections of the overlay.

DETAILED DESCRIPTION OF PREFERRED EMBODIMENTS

Figure 1:
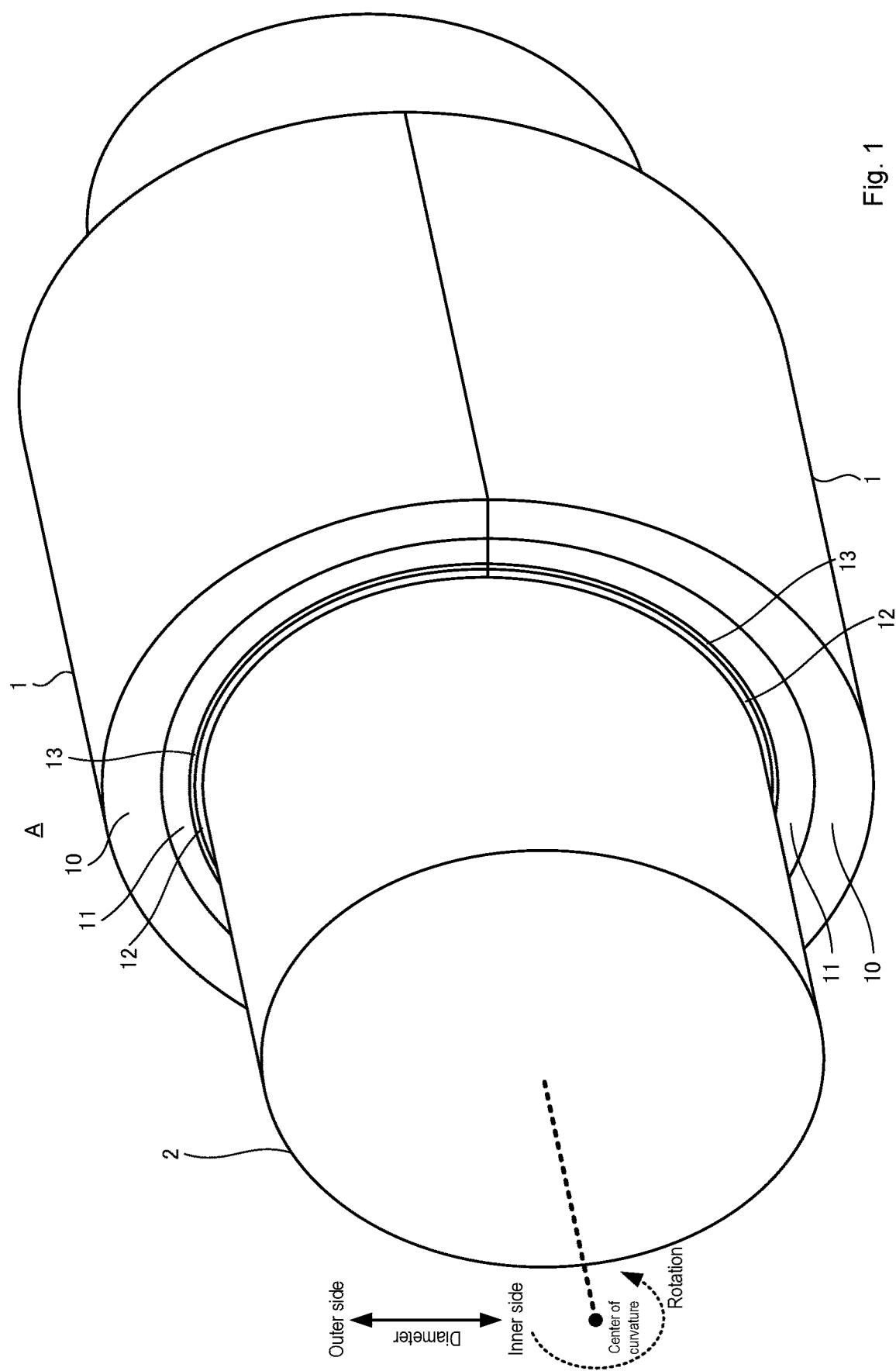
FIG. 1 is a perspective view of a sliding member according to an embodiment of the present invention.

Embodiments of the present invention will be described in the following order.
(1) First embodiment:
(1-1) Structure of sliding member:
(1-2) Method for manufacturing sliding member:
(2) Other embodiments:

(1) First Embodiment (1-1) Structure of Sliding Member:

FIG. 1 is a perspective view of a sliding member 1 according to one embodiment of the present invention. The sliding member 1 includes a back metal 10, a lining 11, and an overlay 12. The sliding member 1 is a half-shaped metallic member obtained by dividing a hollow cylinder into two equal parts in a diametrical direction, and has a semi-circular arc shape in cross section. By combining the two sliding members 1 so as to form a cylindrical shape, a sliding bearing A is formed. The sliding bearing A bears a cylindrical counter shaft 2 (crankshaft of an engine) in a hollow portion formed therein. The outer diameter of the counter shaft 2 is formed to be slightly smaller than the inner diameter of the sliding bearing A. A lubricating oil (engine oil) is supplied to a gap formed between the outer peripheral surface of the counter shaft 2 and the inner peripheral surface of the sliding bearing A. At that time, the outer peripheral surface of the counter shaft 2 slides on the inner peripheral surface of the sliding bearing A.

The sliding member 1 has a structure in which the back metal 10, the lining 11, an intermediate layer 13, and the overlay 12 are laminated in an order of being distant from the center of curvature. Therefore, the back metal 10 constitutes the outermost layer of the sliding member 1, and the overlay 12 constitutes the innermost layer of the sliding member 1. The back metal 10, the lining 11, the intermediate layer 13 and the overlay 12 each have a constant thickness in the circumferential direction. The thickness of the back metal 10 is 1.8 mm, the thickness of the lining 11 is 0.2 mm, the thickness of the intermediate layer 13 is, for example, 2.0 µm, and the thickness of the overlay 12 is 20 µm. Twice the radius of the surface on the curvature center side of the overlay 12 (the inner diameter of the sliding member 1) is 55 mm. The width of the sliding bearing A is 19 mm. Hereinafter, the term "inner side" means the curvature center side of the sliding member 1, and the term "outer side" means the side opposite to the center of curvature of the sliding member 1. The inner surface of the overlay 12 constitutes the sliding surface for the counter shaft 2.

The back metal 10 is formed of steel containing 0.15% by mass of C, 0.06% by mass of Mn, and the balance Fe. It suffices that the back metal 10 is formed of a material that can support the load from the counter shaft 2 via the lining 11 and the overlay 12, and the back metal 10 may not necessarily be formed of steel.

The lining 11 is a layer laminated on the inner side of the back metal 10 and constitutes the base layer of the present invention. The lining 11 contains 10% by mass of Sn, 8% by mass of Bi, and the balance consisting of Cu and unavoidable impurities. The unavoidable impurities of the lining 11 are Mg, Ti, B, Pb, Cr, and the like, and are impurities mixed in refining or scrapping. The content of the unavoidable impurities in the lining 11 is 0.5% by mass or less in total.

The intermediate layer 13 is formed of pure Ag. The content of the unavoidable impurities in the intermediate layer 13 is 0.5% by mass or less in total.

The overlay 12 is a layer laminated on the inner surface of the lining 11. The overlay 12 is an alloy plating film of Bi and Sb. Moreover, the overlay 12 contains Bi, Sb, and unavoidable impurities. The content of the unavoidable impurities in the overlay 12 is 0.5% by mass or less in total.
[Table 1]

Figure 2:
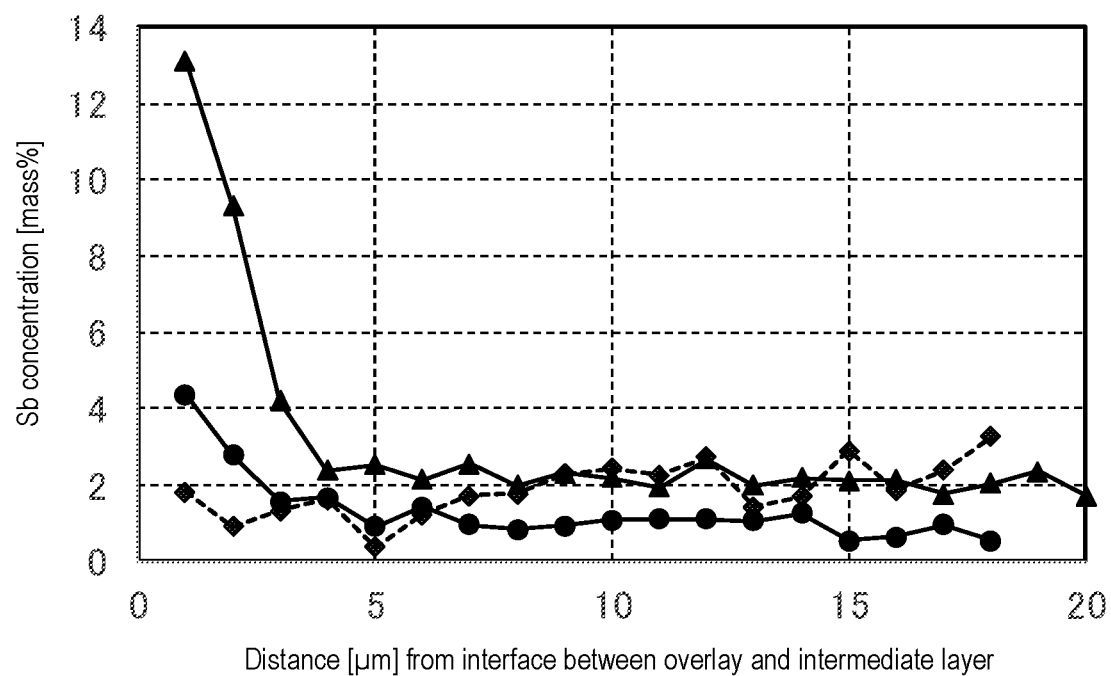
FIG. 2 is a graph of the concentration of Sb in an overlay.

Table 1 indicates the concentration (mass concentration) of Sb in the overlay 12. FIG. 2 is a graph showing the concentration (mass concentration) of Sb in the overlay 12. The horizontal axis in FIG. 2 indicates the distance from the interface between the overlay 12 and the intermediate layer 13, and the vertical axis indicates the concentration of Sb. In Table 1 and FIG. 2, the concentration of Sb in sample A (triangles) converging to about 2% by mass, the concentration of Sb in sample B (circles) converging to about 1% by mass, and the concentration of sample C (squares) having no concentration gradient are indicated. As shown in FIG. 2, in samples A and B, the concentration of Sb becomes maximum at the interface between the overlay 12 and the intermediate layer 13. In samples A and B, as the distance from the interface between the overlay 12 and the intermediate layer 13 increases (as the depth from the surface of the overlay 12 decreases), the concentration of Sb decreases continuously. The average concentration of Sb in the entire overlay 12 was 3.05% by mass.

In samples A and B, the inclination (absolute value) of the concentration of Sb decreases as the distance from the interface between the overlay 12 and the intermediate layer 13 increases, and the concentration of Sb converges almost constantly in a region where the distance from the interface between the overlay 12 and the intermediate layer 13 is 4 µm or more. In samples A and B, the inclination and standard deviation of the concentration of Sb in a first region where the depth from the surface of the overlay 12 is a first depth (region where the distance from the interface X between the overlay 12 and the intermediate layer 13 is 4 µm or less) are larger than the inclination and standard deviation of the concentration of Sb in a second region where the depth from the surface of the overlay is shallower than the first depth (region where the distance from the interface X between the overlay 12 and the intermediate layer 13 is larger than 4 µm).

The inclination of the concentration of Sb in the first region of sample A is 7.6 times the inclination of the concentration of Sb in the second region. The standard deviation of Sb in the first region of sample A is 18.1 times the standard deviation of the concentration of Sb in the second region. On the other hand, the inclination of the concentration of Sb in the first region of sample B is 3.7 times the inclination of the concentration of Sb in the second region. The standard deviation of Sb in the first region of sample B is 3.2 times the standard deviation of the concentration of Sb in the second region.

The overlay 12 of the present embodiment is formed by the same manufacturing method as that for sample A, and the concentration of Sb on the surface of the overlay 12 having a film thickness of 20 µm was 1.8% by mass. Therefore, it can be determined that the concentration gradient of Sb similar to that in sample A in FIG. 2 exists also in the present embodiment. The concentration of Sb in the overlay 12 can be adjusted by increasing or decreasing the Sb concentration in a plating bath for electroplating of the overlay 12 which will be described later.

Figure 3A:
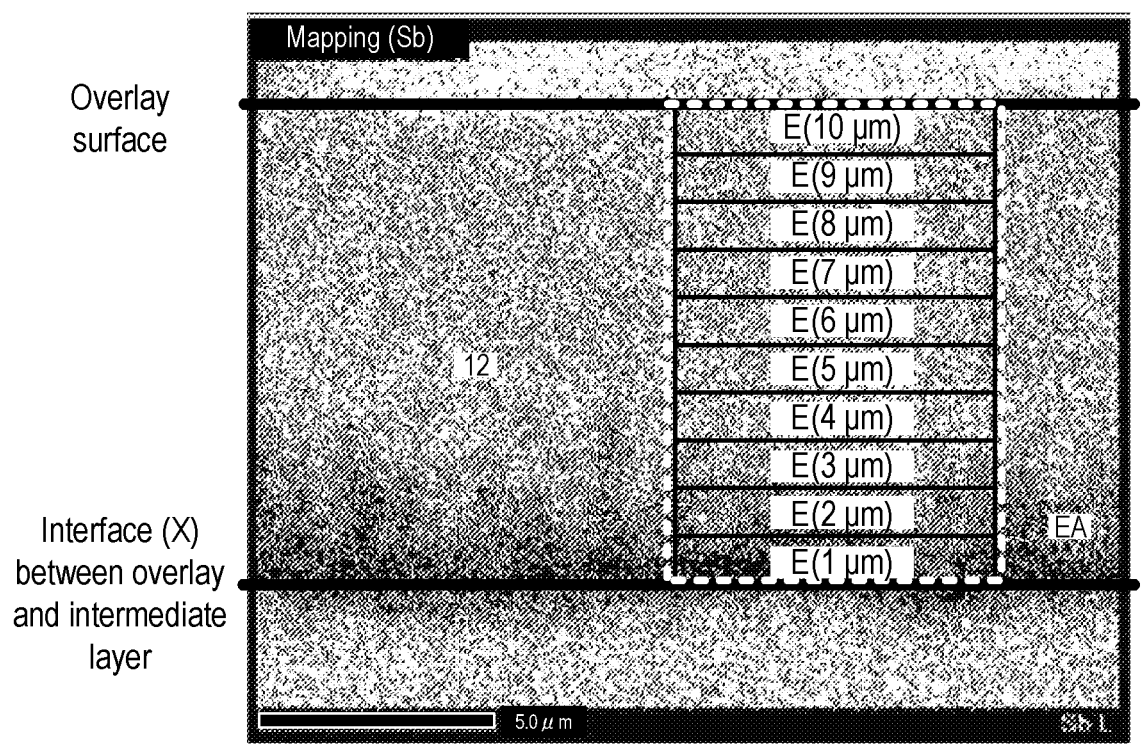
FIGS. 3A and 3B are photographs of cross sections of the overlay.
Figure 3B:
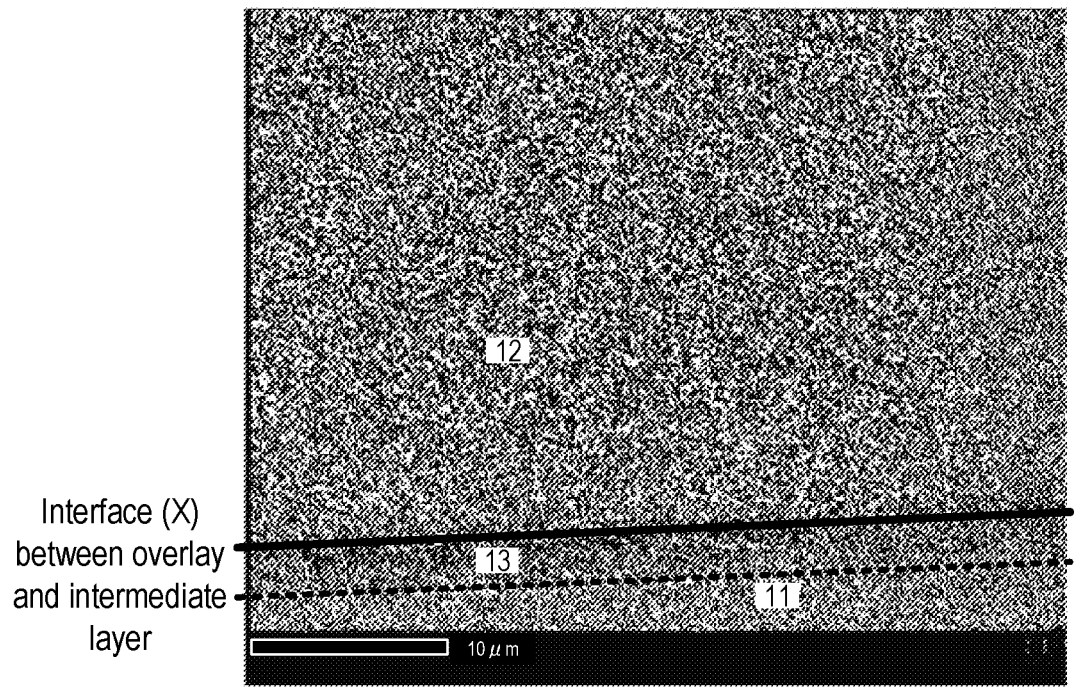

FIGS. 3A and 3B are photographs of cross sections of the overlay 12. In the photographs of the cross sections in FIGS. 3A and 3B, mapping is performed with a site having a higher concentration of Sb being displayed in a darker color. As shown in FIG. 3, as the depth from the surface of the overlay 12 decreases, the concentration of Sb decreases continuously. That is, as the depth from the surface of the overlay 12 increases, the concentration of Sb increases continuously. In addition, since the balance of Sb can be considered to be Bi, the concentration of Bi decreases continuously as the depth from the surface of the overlay 12 increases. That is, as the depth from the surface of the overlay 12 decreases, the concentration of Bi increases continuously. Note that FIG. 3A is an image of a cross section of the overlay 12 having a thickness of about 10 µm.

The concentration of Sb in the overlay 12 was measured by energy dispersive X-ray spectroscopy using an electron beam microanalyzer (JMS-6610A, manufactured by JEOL Ltd.). Specifically, a plurality of rectangular regions E in which the distance from the interface X between the overlay 12 and the intermediate layer 13 to the upper end (end on the surface side) differs by 1 µm are set, and the average mass concentration of Sb in the rectangular regions E was measured as the mass concentration of Sb at each distance. An entire region EA constituted by all the rectangular regions E was set, and the average mass concentration of Sb in the entire region EA was measured as the average concentration of Sb in the entire overlay.

Figure 4:
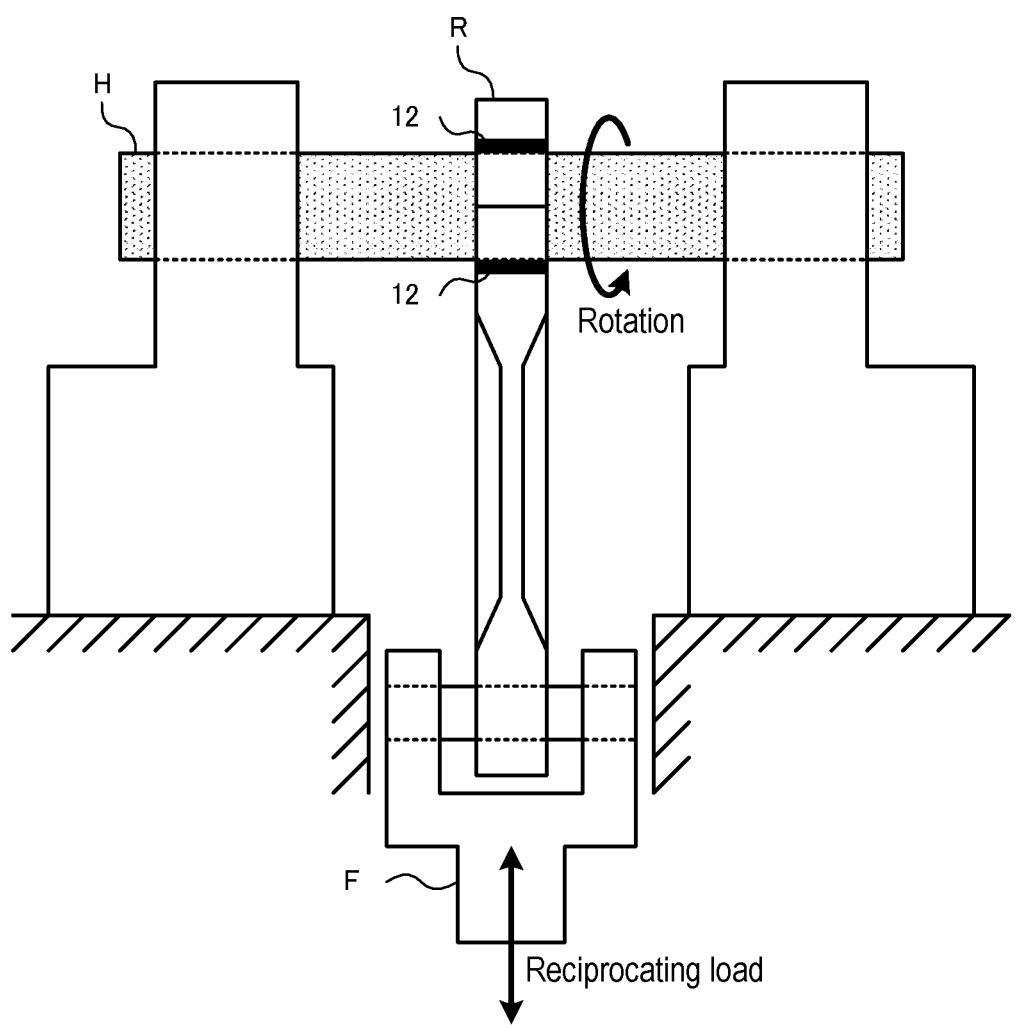
FIG. 4 is an explanatory diagram of a fatigue test.

A fatigue test piece (connecting rod R) in which the intermediate layer 13 was omitted from the above-explained sliding member 1 was prepared to measure its fatigue area rate. As a result, the fatigue area rate was 30%, which was good. It has been confirmed that, when the average concentration of Sb in the entire overlay 12 is low, i.e., 3.05% by mass as in the present embodiment, Cu is hardly diffused from the lining 11 into the overlay, even in the absence of the intermediate layer 13. Therefore, it is considered that, when the average concentration of Sb in the entire overlay is low, i.e., 3.05% by mass as in the present embodiment, the same fatigue area rate can be obtained in the presence and absence of the intermediate layer 13. If the intermediate layer 13 itself is broken or peeling occurs at the interface of the intermediate layer 13, the presence of the intermediate layer 13 will affect the fatigue area rate. It is considered that, in the present embodiment, the same fatigue area rate could be obtained in the presence and absence of the intermediate layer 13 because the intermediate layer 13 was not broken or peeled. Therefore, the fatigue test piece without the intermediate layer 13 was used. The fatigue area rate was measured through the following procedures. FIG. 4 is an explanatory diagram of a fatigue test. First, as shown in FIG. 4, a connecting rod R having cylindrical through holes formed at both ends in the longitudinal direction was prepared, and a test shaft H (hatching) was borne in the through hole at one end.

An overlay 12 (black) similar to that of the sliding member 1 was formed on the inner peripheral surface of the through hole for bearing the test shaft H formed in the connecting rod R. The test shaft H was borne on both outer sides of the connecting rod R in the axial direction of the test shaft H, and the test shaft H was rotated so that a sliding speed arrived at 6.6 m/sec. The sliding speed is a relative speed between the surface of the overlay 12 and the test shaft H. The end portion of the connecting rod R on the side opposite to the test shaft H was connected to a moving body F reciprocating in the longitudinal direction of the connecting rod R, and the reciprocating load of the moving body F was set to 80 MPa. Also, engine oil at about 140° C. was fed between the connecting rod R and the test shaft H.

By continuing the above state for 50 hours, the fatigue test of the overlay 12 was carried out. After the fatigue test, the inner surface (sliding surface) of the overlay 12 was photographed from a position on a straight line orthogonal to the surface in such a manner that the straight line served as the main optical axis. The taken image was used as an evaluation image. Then, the damaged portion in the surface of the overlay 12 reflected in the evaluation image was observed with a binocular (magnifying glass) and identified. The percentage of a value obtained by dividing the damaged portion area, which was the area of the damaged portion, by the area of the entire surface of the overlay 12 reflected in the evaluation image was measured as the fatigue area rate.

In the present embodiment described above, since the overlay 12 contains not only soft Bi but also hard Sb, the hard Sb can improve the fatigue resistance. In addition, since the concentration of Sb increases as the depth from the surface increases, good conformability can be realized in the initial stage of wear, and high wear resistance can be realized at a stage where wear progresses. Furthermore, since the concentration of Sb increases as the depth from the surface increases, interlayer peeling can be prevented.

Also, the inclination of the concentration of Sb in a first region where the depth from the surface of the overlay 12 is a first depth (region where the distance from the interface X between the overlay 12 and the intermediate layer 13 is 4 μm or less) is larger than the inclination of the concentration of Sb in a second region where the depth from the surface of the overlay is shallower than the first depth (region where the distance from the interface X between the overlay 12 and the intermediate layer 13 is larger than 4 μm). This allows the hardness of the overlay 12 to be rapidly increased as the wear progresses.

It is considered that the effect of Sb described above increases as the average concentration of Sb in the overlay 12 is higher. However, when the average concentration of Sb in the overlay 12 is increased, Cu diffused from the lining 11 into the overlay 12 disadvantageously reduces the fatigue resistance. Therefore, the intermediate layer 13 was formed as a structure for suppressing the diffusion of Cu.

Hereinafter, the results of an effect confirmation test of the intermediate layer 13 will be described.

[Table 2]

Table 2 shows the results of the effect confirmation test of the intermediate layer 13. In the effect confirmation test of the intermediate layer 13, the concentration of Cu in the overlay 12 was measured for six types of samples D1, D2, E1, E2, F1 and F2. Samples D1, D2, E1, E2, F1 and F2 are all sliding members 1 in which the overlay 12 having a high Sb average concentration of 5.0% is formed so as to promote diffusion of Cu.

Samples D1 and D2 are sliding members 1 in which the overlay 12 is directly formed on the lining 11 without the intermediate layer 13 interposed therebetween. Samples E1 and E2 are sliding members 1 in which the overlay 12 is formed on the lining 11 via the intermediate layer 13 formed of pure Ag so as to have a thickness of 2 μm. Samples E1 and E2 have the same structure as that of the intermediate layer 13 of the first embodiment. Samples F1 and F2 are sliding members 1 in which the overlay 12 is formed on the lining 11 via the intermediate layer 13 formed of an Ag—Sn alloy so as to have a thickness of 2 μm. The Ag—Sn alloy contains Sn in an amount of only 30% by mass.

Samples D2, E2, and F2 were heat-treated (retained in air at 150° C. for 50 hours) after completion of the sliding members 1 so that diffusion of Cu could occur. On the other hand, samples D1, E1, and F1 were not heat-treated after completion of the sliding members 1.

FIGS. 5A to 5C are photographs of cross sections of the overlay 12 in samples D2, E2, and F2. In the photographs of the cross sections in FIGS. 5A to 5C, mapping is performed with a site having a higher concentration of Cu being displayed in a darker color. As shown in Table 1, it was found that Cu was diffused into the overlay 12 only in sample D2 having no intermediate layer 13 formed therein and heat-treated. The linear diffusion of Cu from the lining 11 shown in black in sample D2 can also be observed in FIG. 5A. It can be understood that, in the overlay 12 of sample D2, the concentration of Cu was lower as the distance from the interface X increased, and that Cu was diffused from the lining 11. Therefore, it can be understood that, when the sliding member 1 in which the overlay 12 having a high concentration of Sb is formed without formation of the intermediate layer 13 is used in an actual product use environment, Cu is diffused from the lining 11 into the overlay 12, and that the diffused Cu reduces the fatigue resistance.

On the other hand, in samples E2 and F2 provided with the intermediate layer 13, the concentration of Cu was 0% by mass in both cases, despite the heat treatment. Therefore, even when the concentration of Sb in the overlay 12 is increased, it is possible to suppress the amount of Cu diffused from the lining 11 into the overlay 12, and to prevent the diffused Cu from reducing the fatigue resistance. The overlay 12 can be made harder as the concentration of Sb increases, and thus the fatigue resistance can further be improved by increasing the concentration of Sb. Of course, the diffusion of Cu can be reliably prevented by forming the intermediate layer 13 even in the overlay 12 having a low concentration of Sb as in the first embodiment. The method of measuring the concentration of Cu in the overlay 12 is the same as the method of measuring the concentration of Sb.

(1-2) Method for Manufacturing Sliding Member:

First, a flat plate of low carbon steel having the same thickness as the back metal 10 was prepared.

Next, powder of a material constituting the lining 11 was scattered on the flat plate formed of low carbon steel.

Specifically, Cu powder, Bi powder, and Sn powder were scattered on the flat plate of low carbon steel so as to attain the mass ratio among the respective components in the lining 11 described above. It suffices that the mass ratio among the respective components in the lining 11 can be satisfied, and alloy powder such as Cu—Bi or Cu—Sn may be scattered on the flat plate of low carbon steel. The particle sizes of the powders were adjusted to 150 μm or less by a test sieve (JIS Z 8801).

Next, the flat plate of low carbon steel and the powders sprayed on the flat plate were sintered. The sintering temperature was controlled to 700 to 1000° C., and the sintering was performed in an inert atmosphere. After the sintering, the sintered flat plate was cooled. The lining 11 need not necessarily be formed by sintering, and may be formed by casting or the like.

After completion of the cooling, a Cu alloy layer is formed on the flat plate of low carbon steel. The Cu alloy layer contains soft Bi particles precipitated during the cooling.

Next, the low carbon steel having a Cu alloy layer formed thereon was pressed so as to have a shape obtained by dividing a hollow cylinder into two equal parts in the diameter direction. At this time, the pressing process was performed so that the outer diameter of the low carbon steel was matched with the outer diameter of the sliding member 1.

Next, the surface of the Cu alloy layer formed on the back metal 10 was cut. At this time, the cutting amount was controlled so that the thickness of the Cu alloy layer formed on the back metal 10 was the same as that of the lining 11. Thereby, the lining 11 can be formed by the Cu alloy layer after the cutting process. The cutting process was carried out by a lathe with a cutting tool material made, for example, of sintered diamond set.

Next, Ag was laminated by a thickness of 2 μm on the surface of the lining 11 by electroplating, whereby the intermediate layer 13 was formed. Next, Bi was laminated by a thickness of 10 μm on the surface of the intermediate layer 13 by electroplating, whereby the overlay 12 was formed. The electroplating procedures were as follows. First, the surface of the intermediate layer 13 was washed with water. Further, unnecessary oxides were removed from the surface of the intermediate layer 13 by pickling the surface of the intermediate layer 13. Thereafter, the surface of the intermediate layer 13 was again washed with water.

Upon completion of the above pretreatment, electroplating was performed by supplying a current to the lining 11 immersed in a plating bath. The bath composition of the plating bath contained methane sulfonic acid: 150 g/L, methane sulfonic acid Bi: 20 g/L, and an organic surfactant: 25 g/L. In the above plating bath, 0.18 g/L of pure Sb was dissolved by electrolysis. The bath temperature of the plating bath was set to 30° C. Further, the current to be supplied to the lining 11 was a direct current, and the current density was set to 2.0 A/dm$^2$.

In the plating bath, the amount of methane sulfonic acid can be adjusted between 50 and 250 g/L, and the amount of methane sulfonic acid Bi can be adjusted between 5 and 40 g/L. The amount of Sb is 0.1 to 3 g/L. The amount of the organic surfactant can be adjusted between 0.5 and 50 g/L. Also, the bath temperature of the plating bath can be adjusted at 20 to 50° C., and the current density of the current to be supplied to the lining 11 can be adjusted at 0.5 to 7.5 A/dm$^2$. The concentration of Sb in the overlay 12 can be increased by increasing the ion concentration of Sb in the plating bath.

For example, by setting the concentration of Sb in the plating bath to 0.2 g/L, the concentration of Sb (triangles) converging to about 2% by mass in FIG. 2 was obtained. By setting the concentration of Sb in the plating bath to 0.1 g/L, the concentration of Sb (circles) converging to about 1% by mass in FIG. 2 was obtained. Moreover, it was revealed that the concentration gradient of Sb is realizable by using methane sulfonic acid in the plating bath. When the overlay 12 was formed in a plating bath using EDTA (ethylenediaminetetraacetic acid) instead of methane sulfonic acid, an overlay 12 having no concentration gradient, as in sample C in FIG. 2, was formed. However, when methane sulfonic acid is used in the plating bath, the Sb concentration gradient is not always formed, and it is also possible to form the overlay 12 having no Sb concentration gradient as shown in FIG. 3A.

After electroplating was performed in the above manner, water washing and drying were performed. Thus, the sliding member 1 was completed. Furthermore, the sliding bearing A was formed by combining the two sliding members 1 in a cylindrical shape, and attached to the engine.

(2) Other Embodiments

Figure 6:
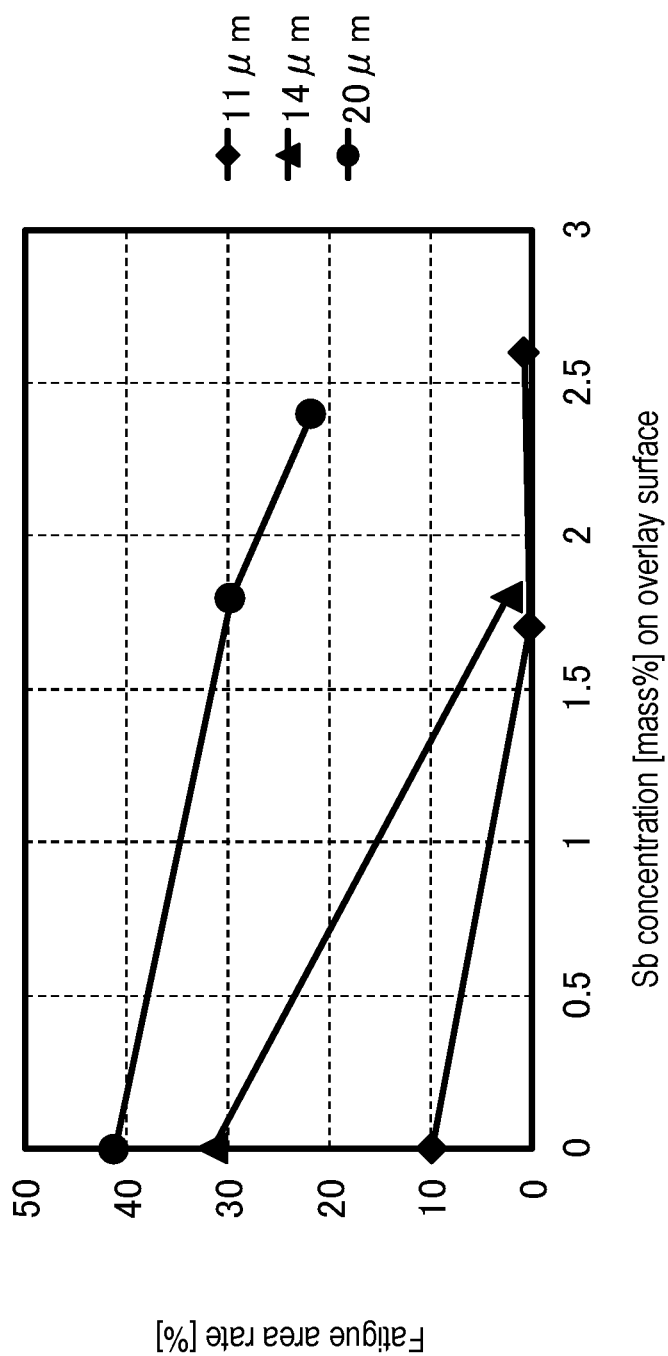
FIG. 6 is a graph showing the relationship between the concentration of Sb and the fatigue area rate.

Table 2 indicates the results of measuring the fatigue area rates of a plurality of samples 1 to 8 in which the film thickness of the overlay 12 and the concentration of Sb on the surface were changed. Note that the first embodiment corresponds to sample 7. FIG. 6 is a graph of the fatigue area rates of samples 1 to 8. The vertical axis in FIG. 6 indicates the fatigue area rate, and the horizontal axis indicates the concentration of Sb on the surface.

[Table 3]

First, as the film thickness of the overlay 12 is larger, the fatigue area rate increases. This is considered to be because the stress acting on the inside of the overlay 12 increases as the film thickness of the overlay 12 increases, regardless of the concentration of Sb. However, it could be confirmed that the fatigue area rate can be reduced at any film thickness by incorporating Sb in the overlay 12. Therefore, the sliding member 1 having good fatigue resistance can be formed even if the film thickness of the overlay 12 is 20 μm as in the embodiment described above.

In addition, when the fatigue area rates are compared at the same film thickness, the fatigue area rate can be suppressed more as the concentration of Sb on the surface is higher. By setting the concentration of Sb on the surface to 1.0% by mass or more and 3.0% by mass or less (desirably 1.7% by mass or more and 2.6% by mass or less), the fatigue area rate can be suppressed.

In the above embodiment, the sliding members 1 constituting the sliding bearing A for bearing the crankshaft of an engine have been illustrated, but a sliding bearing A for another purpose may be formed by the sliding members 1 of the present invention. For example, a radial bearing such as a transmission gear bush or a piston pin bush/boss bush may be formed by the sliding member 1 of the present invention. Furthermore, the sliding member of the present invention may be used in thrust bearings, various washers, or swash plates for car air-conditioner compressors. Further, the matrix of the lining 11 is not limited to the Cu alloy, and it suffices that the material of the matrix is selected depending on the hardness of the counter shaft 2. Also, the back metal 10 is not essential and may not be used. The thickness of the intermediate layer 13 is not limited to 2.0 μm, and may be any thickness ranging from 0.5 to 10.0 μm (desirably 1 to 5.0 μm). By setting the thickness of the intermediate layer 13 to 0.1 μm or more, the possibility that defects such as pinholes will occur in the intermediate layer 13 can be reduced. By making the thickness of the intermediate layer 13 larger than 1 μm, the diffusion of Cu can be surely prevented by the intermediate layer 13.

REFERENCE SIGNS LIST

1 Sliding member
2 Counter shaft
10 Back metal
11 Lining
12 Overlay
A Bearing
E Rectangular region
F Moving body
H Test shaft
R Connecting rod
X Interface

The invention claimed is:
1. A sliding member comprising an overlay formed of an alloy plating film of Bi and Sb,
   wherein the overlay is bonded to a lining formed of a copper alloy via an intermediate layer containing Ag as a main component, and
   wherein the intermediate layer is formed of an Ag—Sn alloy;
   wherein a thickness of the intermediate layer is 0.1 μm or more and 4.9 μm or less.

* * * * *